United States Patent [19]
Kloz et al.

[11] 3,792,701
[45] Feb. 19, 1974

[54] NEUTRALISING DEVICE FOR URINARY, URETERAL AND KIDNEY PELVIS CALULI

[76] Inventors: Eduard Kloz; Heinz Kloz, both of 36 Teufenstrasse, Villingendorf, Germany

[22] Filed: Nov. 2, 1971

[21] Appl. No.: 194,833

[30] Foreign Application Priority Data
Nov. 3, 1970   Germany............................ 2053982

[52] U.S. Cl.................................... 128/7, 128/328
[51] Int. Cl............................................... A61b 1/30
[58] Field of Search........................... 128/6, 7, 328

[56] References Cited
UNITED STATES PATENTS

| | | | |
|---|---|---|---|
| 1,127,948 | 2/1915 | Wappler | 128/328 X |
| 1,303,135 | 5/1919 | Wappler | 128/328 X |
| 2,227,727 | 1/1941 | Leggiadro | 128/6 |
| 2,243,057 | 5/1941 | Wolf | 128/328 |
| 2,279,714 | 4/1942 | Meyerhof et al. | 128/7 |
| 3,334,630 | 8/1967 | Kramer | 128/328 |
| 3,413,976 | 12/1968 | Roze | 128/328 |

FOREIGN PATENTS OR APPLICATIONS

| | | | |
|---|---|---|---|
| 1,218,112 | 6/1963 | Germany | 128/328 |

Primary Examiner—Lucie H. Laudenslager
Attorney, Agent, or Firm—Markva & Smith

[57] ABSTRACT

A device for neutralization of calculi in the urinary tract, ureteral tract and kidney comprising a probe means and a piezoelectric transducer for producing ultrasonic vibration in the probe means. The transducer has piezoelectric discs disposed between a base member and a sound transmitting member. Mechanical means are provided to tightly hold the base member, piezoelectric discs and sound transmitting member together. The transducer is interconnected with the probe means for transmitting ultrasonic vibrations from the transducer to the probe means.

The mechanical means in a specific embodiment comprises a one-piece bolt having a cross-section along its end portion of an exponential horn which is reduced exponentially as a function of its length. The end of the horn-shaped end portion is designed as a cylindrical, straight socket having an internal bore into which rigid or flexible vibrating probes may be attached. the probe means includes a light conductor of a cystoscope with a common flushing probe member about which water circulates.

11 Claims, 17 Drawing Figures

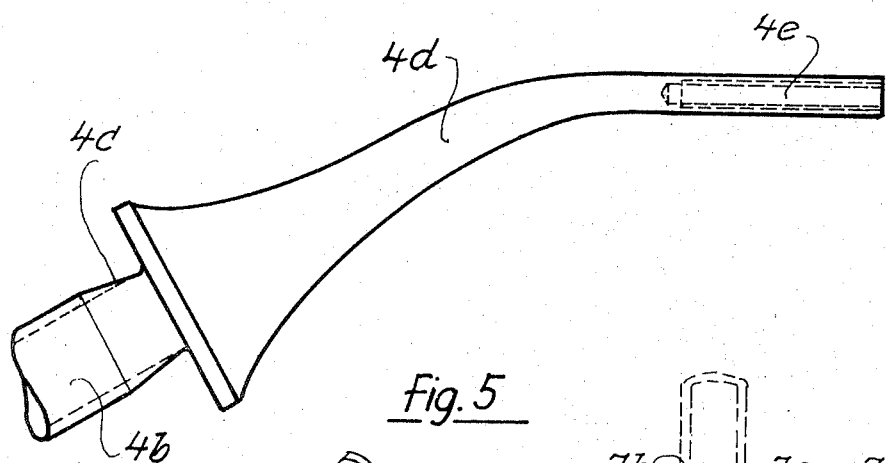
Fig. 3
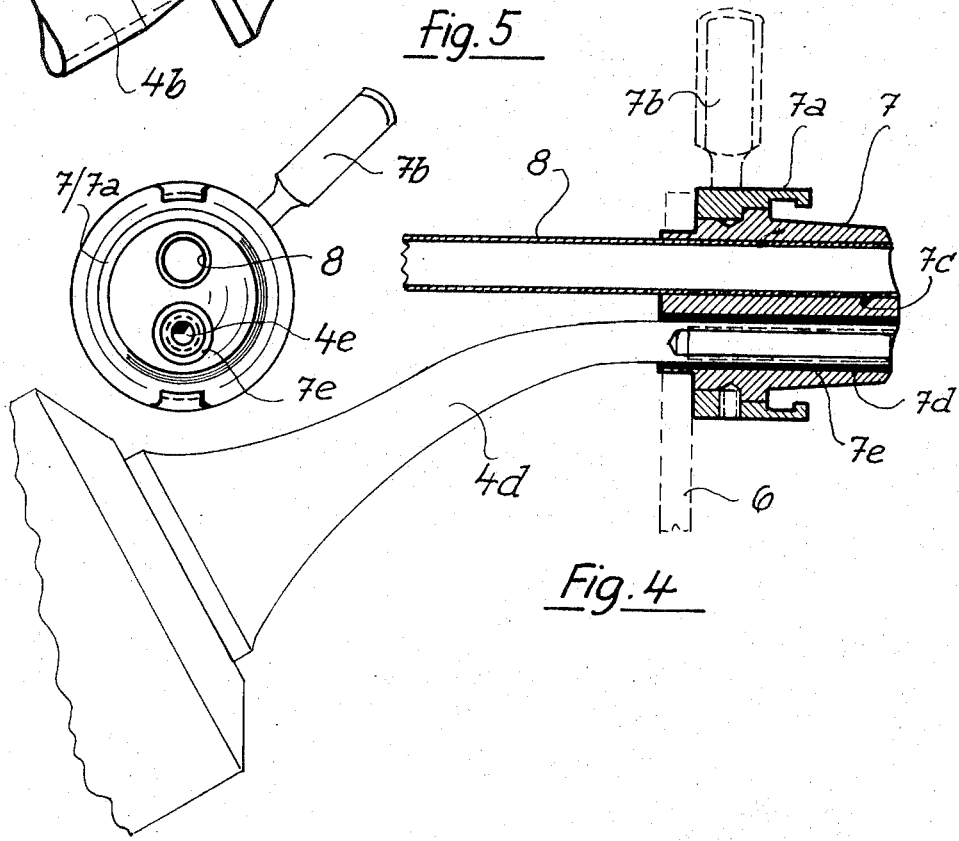
Fig. 5
Fig. 4

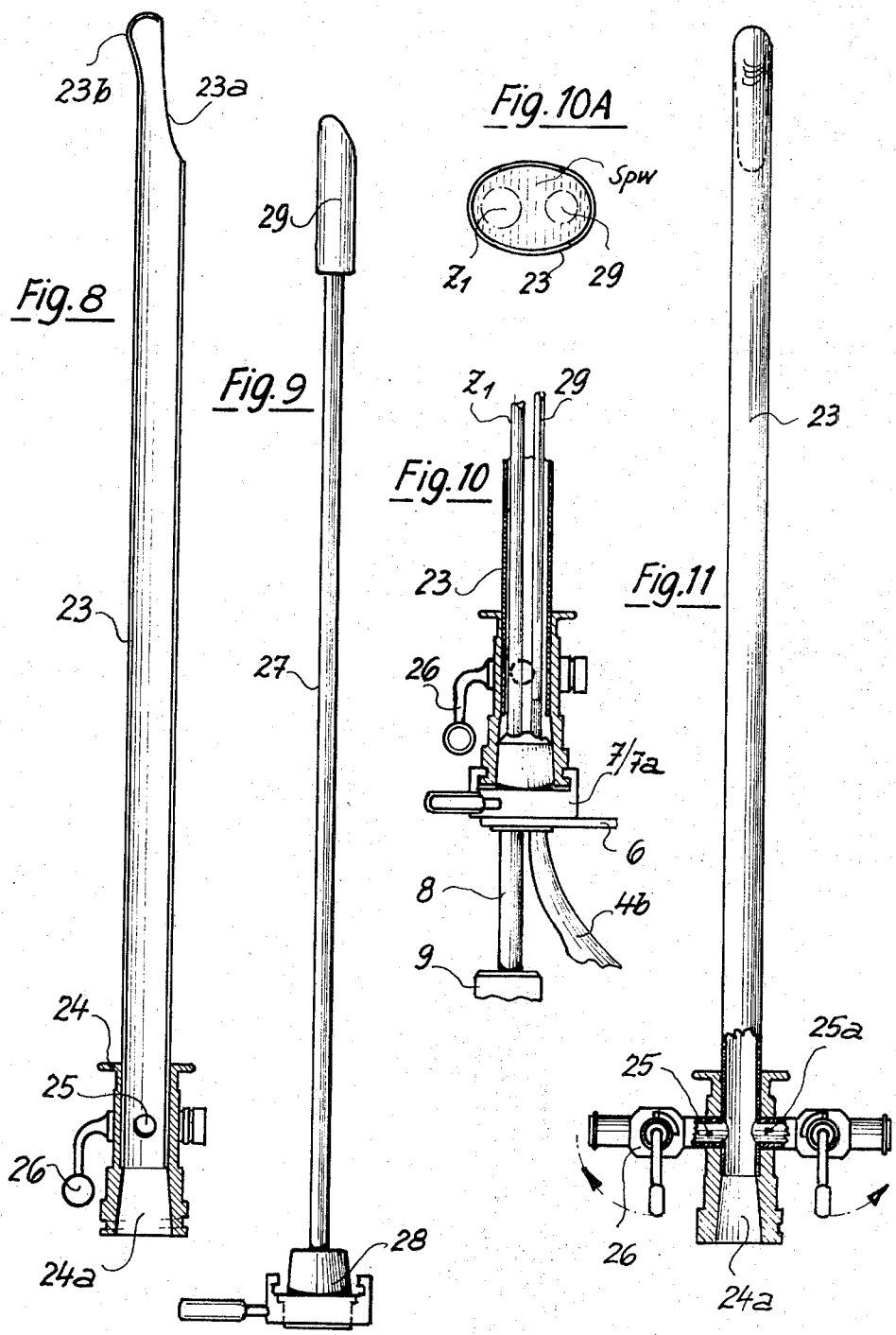

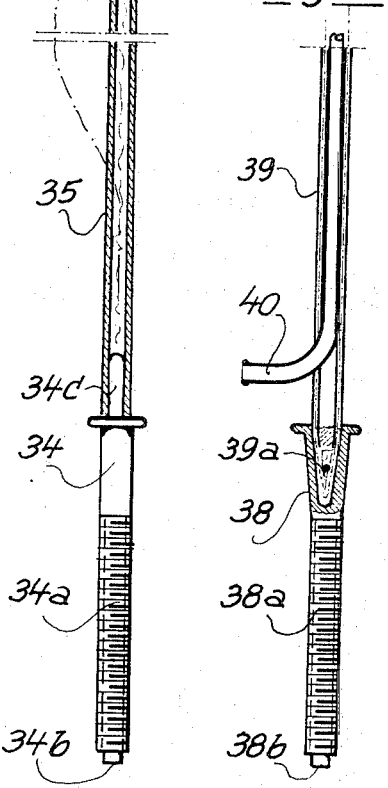

NEUTRALISING DEVICE FOR URINARY, URETERAL AND KIDNEY PELVIS CALULI

BACKGROUND OF THE INVENTION

This invention relates to a novel device for the neutralization preferably of urinary, ureteral and kidney pelvis calculi.

The neutralization or removal, respectively, of urinary, ureteral and kidney pelvis calculi is still very problematic. It is known how to remove such stones surgically, or to withdraw certain stones by means of a loop catheder, how to disintegrate certain stones chemically by altering the pH value, how to distintegrate the stones by hydraulic shock wave action and how to crush less hard urinary calculi mechanically, by means of a lithotriptor probe. In all cases, all these processes can be applied only to a limited extent and means that the patient is frequently subject to very unpleasant and time-consuming treatments and secondary effects.

SUMMARY OF THE INVENTION

To overcome all these difficulties it is the object of the present invention to induce, by ultrasonic action, resonant vibrations preferably in urinary, ureteral and kidney pelvis calculi in the organs so that the said calculi disintegrate to minute particles which can easily be removed from the organs concerned.

To attain this object the present invention provides a device for neutralization preferably of urinary, ureteral and kidney pelvis calculi, wherein the connecting element passing through all individual components of a known piezoelectric transducer and connecting these components, which is cylindrical or tapers towards the centre and then flares again, has, at the main radiant end face of the transducer, a trumpet-shaped flare and ends in a slight curve as an exponential horn, the cross section of which is reduced exponentially as a function of its length, the end section of said exponential horn being designed as a cylindrical, straight socket with internal bore for the screw-in working attachments in the form of rigid and flexible vibrating probes, and wherein the probe concerned is provided and active, together with the light conductor of the cystoscope, in a common flushing probe, about which circulates water.

New are also the forms and designs of the rigid and flexible vibrating probes and the variable forms of the heavy duty transducer. It is further proposed, in accordance with the invention, to make use of a lithotrite as a means for transmitting the ultrasound so as to act as a disintegrator.

BRIEF DESCRIPTION OF THE DRAWINGS

Some embodiments of the invention will now be described by way of example and with reference to the accompanying drawings, in which:

FIG. 3 is an enlarged view of the exponential horn;

FIG. 4 is a sectional view through the cone serving as a bearing for the vibrator tube and the guide tube for the cystoscope;

FIG. 5 is a front view of the cone;

FIG. 8 shows a flushing probe;

FIG. 9 shows a mandrin known per se;

FIG. 10 shows a detail variant of the guide cone with vibrating probe, light conductor and flushing probe in section;

FIG. 10a is an enlarged cross section of the flushing probe with light conductor and vibrating probe;

FIG. 11 is another view, partly in section, of the flushing probe;

FIG. 12 shows a rigid vibrating probe;

FIG. 13 shows a flexible vibrating probe, partly in section;

FIG. 14 shows a modified, flexible vibrating probe, and

FIG. 15 and 15a show a further possible embodiment of the flexible vibrating probe.

DESCRIPTION OF THE PREFERRED EMBODIMENT

Figure 1:
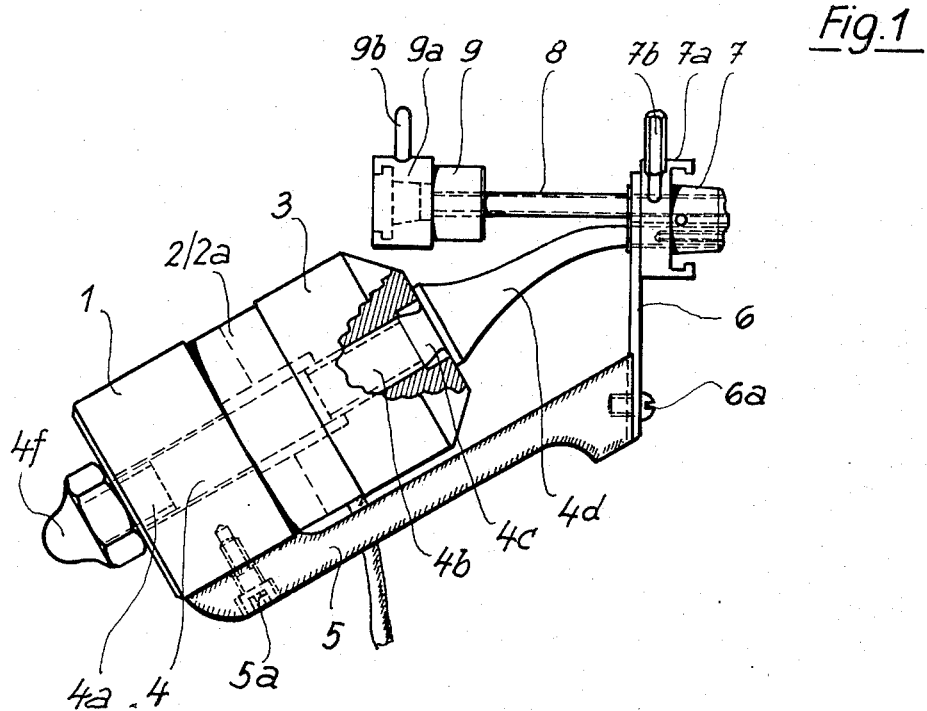
FIG. 1 shows a transducer with exponential horn for connection of the vibrating probes and with a coupling element for the cystoscope.

According to FIG. 1, 1 is a steel body or base member, 2 and 2a are piezoelectric ceramic discs and 3 is an aluminum body or sound transmitting member of the piezoelectric transducer. A high-alloy steel bolt 4 constitutes a mechanical means for connecting these four elements. The steel bolt 4 has threads 4a and 4b and is tightened and locked to the steel body 1 by means of an external nut 4f. Thus it is evident that the base member 1, piezoelectric discs 2 and 2a and sound transmitting member 3 are tightly held together. 4c and 4d is the trumpet-shaped flare end portion of the said steel bolt in the region of the main sound transmitting end face of aluminum body 3. The end portion 4c and 4d tapers conically towards the end in a flat curve so as to form an exponential horn. A fixing arm 5 is attached by means of a screw 5a in a groove of the steel body 1. The arm 5 has at its free end a lever 6 which can be adjusted by means of a slot and a screw 6a. Lever 6 serves as an adjustable holder for the cone 7 having a locking device 7a and 7b. 8 is a socket tube with closing devices 9, 9a and 9b of a known type for mounting and locking the cystoscope Z.

Figure 2:
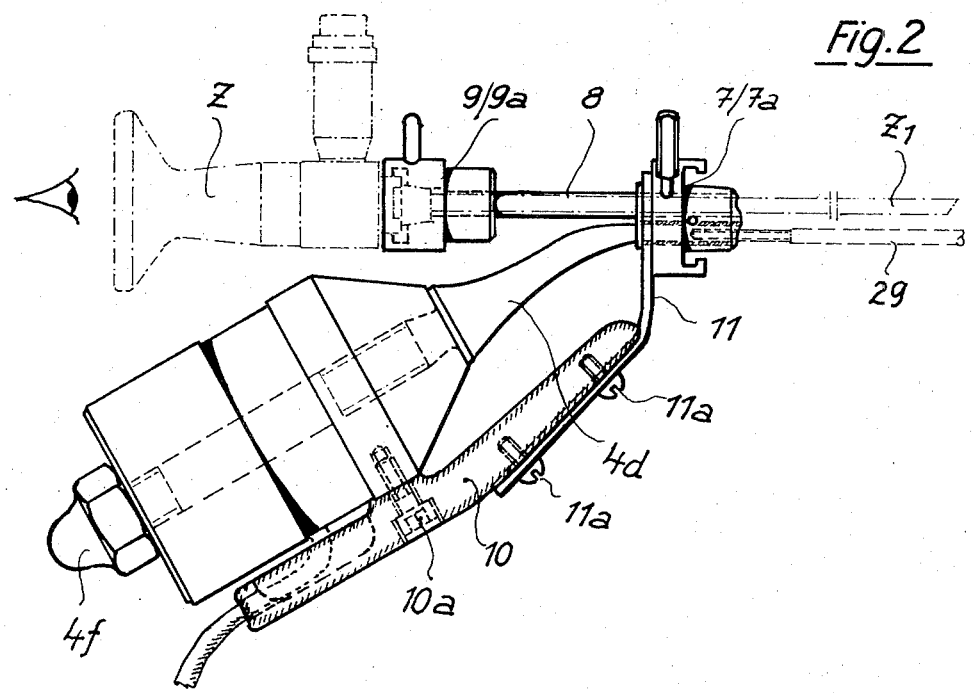
FIG. 2 shows a modified version of the embodiment according to FIG. 1.

According to FIG. 2, a fixing arm 10, which in turn is outside the vibration range, is connected with the transducer by means of a screw 10a, an angular lever 11 for attachment of the cone 7 being attached to the free end of the said transducer by means of a screw 11a which is also adjustable.

According to FIG. 3, 4b, 4c and 4d with the internal bore 4e relate to an enlarged view of the exponential horn.

According to FIGS. 4 and 5, is the above-mentioned core with the bores 7c for the guide tube 8 through which the cystoscope is entered. The end piece of the exponential horn 4d is inserted in bore 7e. The sound insulating sleeves 7d and the closure means 7a and 7b are known structures.

Figure 6:
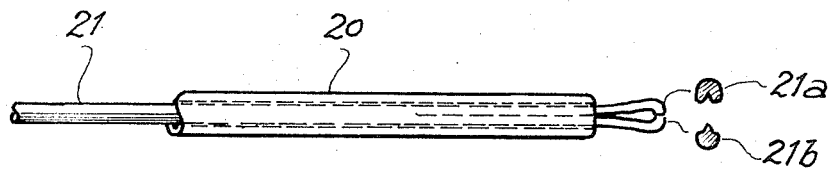
FIG. 6 and 7 shows the jaws of a lithotrite in two positions.
Figure 7:
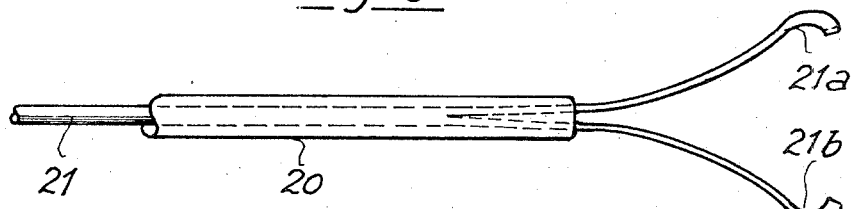

According to FIGS. 6 and 7, a lithotrite 21 with claw-shaped jaws 21a and 21b and located with a tube 20 so as to be free to move, serves as a vibrating, transmitting and acting device.

According to FIGS. 8, 9, 10 and 11, the reference numeral 23 denotes a flushing probe which has initially to be introduced into the bladder by means of a mandrin 27, 28 and 29, said flushing probe 23 being provided with closure elements 24 and 24a known per se, water connections and closure cocks 25, 25a and 26 and a spoon-shaped leading end 23a, 23b.

According to FIGS. 10 and 10a, 23 is a flushing tube which is slid over the cone 7 and secured by means of the locking device 7a. Z1 is the light conductor of cystoscope Z and 29 is a vibrating probe, and Spw the flushing water passing through tube 23.

According to FIG. 12, the reference numeral 29 denotes a rigid probe with a male thread 29a and a sound transmitting spigot 29b, the male thread 29a of the probe being followed in the diretion towards the cup-shaped hollow disintegration head 29e by a conically tapering section 29c and an again slightly flaring section 29d.

FIG. 13 shows a flexible probe 30 with a male thread 39a, a sound transmitting spigot 39b, a plastic sleeve 33 and a vibrating wire core 31. 32 is again the cup-shaped hollow disintegration head.

FIG. 14 shows a flexible probe 34 with a plastic sleeve 35, a male thread 34a, a sound transmitting spigot 34b and a sound transmitting element 34c which transmits the vibrations via a mercury column 36 to a cup-shaped disintegration head 37, 37a.

According to FIGS. 15 and 15a, 38 is a sound transmitting means consisting of many individual wires 39a which are arranged in the manner of a wreath between an outer tube 39 and a flushing tube 40. 38a is a male thread and 38b is a sound transmitting spigot.

The invention may be embodied in other specific forms without departing from the spirit or essential characteristics thereof. The embodiment is therefore to be considered in all respects as illustrative and not restrictive.

What is claimed is:

1. A device for neutralization of calculi in the urinary tract, ureteral tract and kidney comprising:
   a. a probe means,
   b. a piezoelectric transducer for producing ultrasonic vibrations in the probe means,
   c. said transducer having a base member, a sound transmitting member and piezoelectric discs disposed between the base member and the sound transmitting member,
   d. mechanical means for tightly clamping the base member, piezoelectric discs and sound transmitting member together, and
   e. means for interconnecting said transducer to the probe means for transmitting ultrasonic vibrations from the transducer to the probe means.

2. A device as defined in claim 1 wherein
said probe means includes a probe member having an operating end and being connected to the transducer for vibration and further including a shaft means through which said probe member passes,
said shaft member being supported by the transducer.

3. A device as defined in claim 2 wherein
said shaft includes an inlet and an outlet for circulating water around the probe member and means for conducting light from a cystoscope to the operating end of the vibrating probe.

4. A device as defined in claim 2 wherein
said interconnecting means includes retaining means attached to the transducer outside the vibration effects of the transducer and a cone mounted on the retaining means,
said cone being adapted to carry the shaft means which houses the probe member and is further adapted to carry a cystoscope so that the operating end of the probe member may be viewed during operation.

5. A device as defined in claim 1 wherein
said mechanical means includes a bolt member passing through the base member, piezoelectric discs and sound transmitting member,
said bolt member firmly holding the members and discs of the transducer from each end of the transducer,
said interconnecting means including means for transmitting vibrations from the bolt member to the probe means.

6. A device as defined in claim 5 wherein
said probe means includes a probe member and
said probe interconnecting means includes a tapered sound transmitting end portion having a free end and being formed on the bolt member as a one-piece configuration,
said end portion being threadedly engaged with said probe member so that ultrasonic vibrations are transmitted from the transducer via the end portion.

7. A device as defined in claim 6 wherein
a nut is fixedly tightened against the outside of the base member of the transducer, and
the bolt member is in threaded engagement with said sound transmitting member of the transducer and is in threaded engagement with said nut.

8. A device as defined in claim 6 wherein
the sound transmitting end portion of the bolt member tapers exponentially to its free end from the sound transmitting member of the transducer, runs in the form of an arc to a straight end having an inside thread,
said probe member being threadedly engaged with said inside thread.

9. A device as defined in claim 6 wherein
said probe member is developed cylindrically beyond the end of its threaded engagement with the vibration transmitting end portion of the one-piece bolt and then tapers conically and flares at its free end into a cup-shaped crushing end.

10. A device as defined in claim 1 wherein
said probe means includes a hollow probe member having a hose connection for rinsing water to be conducted through the probe member to the operating end thereof.

11. A device as defined in claim 10 wherein
said interconnecting means includes retaining means attached to the transducer outside the vibration effects of the transducer and a cone mounted on the retaining means,
said cone being adapted to carry the shaft means which houses the probe member and is further adapted to carry a cystoscope so that the operating end of the probe member may be viewed during operation.

* * * * *